United States Patent [19]
Keller et al.

[11] Patent Number: 5,081,844
[45] Date of Patent: Jan. 21, 1992

[54] COMBUSTION CHAMBER OF A GAS TURBINE

[75] Inventors: Jakob Keller, Dottikon; Thomas Sattelmayer, Mandach, both of Switzerland

[73] Assignee: Asea Brown Boveri Ltd., Baden, Switzerland

[21] Appl. No.: 487,112

[22] Filed: Mar. 2, 1990

[51] Int. Cl.⁵ .......................... F02C 1/00; F23R 3/46; F23R 3/30
[52] U.S. Cl. ..................................... 60/737; 60/39.37; 60/39.826
[58] Field of Search ...................... 60/737, 738, 39.37, 60/748, 39.826

[56] References Cited

U.S. PATENT DOCUMENTS

| | | | |
|---|---|---|---|
| 4,058,977 | 11/1977 | Markowski et al. | 60/733 |
| 4,194,358 | 3/1980 | Stenger | 60/39.826 |
| 4,271,675 | 6/1981 | Jones et al. | 60/737 |
| 4,587,809 | 5/1986 | Ohmori et al. | 60/737 |
| 4,932,861 | 6/1990 | Keller et al. | 431/8 |

FOREIGN PATENT DOCUMENTS

| | | |
|---|---|---|
| 572173 | 11/1958 | Belgium . |
| 0210462 | 2/1987 | European Pat. Off. . |
| 944310 | 4/1949 | France . |
| 1130091 | 1/1957 | France . |
| 914906 | 1/1963 | United Kingdom . |

*Primary Examiner*—Richard A. Bertsch
*Assistant Examiner*—Howard R. Richman
*Attorney, Agent, or Firm*—Burns, Doane, Swecker & Mathis

[57] ABSTRACT

In an annular combustion chamber (A), a row of premixed burners (B, C) are located in the peripheral direction at the inlet end. The large premixed burners (B), which are the main burners of the annular combustion chamber (A), and the small premixed burners (C), which are the pilot burners of the annular combustion chamber, are located alternately relative to one another and at a uniform distance apart. Both the main burners (B) and the pilot burners (C) enter into a single annular front wall (10).

5 Claims, 4 Drawing Sheets

COMBUSTION CHAMBER OF A GAS TURBINE

BACKGROUND OF THE INVENTION

1. Field of the Invention

The present invention concerns a combustion chamber as described in the preamble to claim 1.

2. Discussion of Background

In view of the extremely low $NO_x$ emissions specified for gas turbine operation, many manufacturers are converting to the use of premixed burners. One of the disadvantages of premixed burners is that they go out even at very low excess air numbers (ratio of the actual air/fuel ratio to the stoichiometric air/fuel ratio), this occurring at a $\lambda$ of about 2, depending on the temperature after the gas turbine compressor. For this reason, such premixed burners must be supported by one or more pilot burners in part-load operation of a gas turbine. Generally speaking, diffusion burners are used for this purpose. Although this technique permits very low $NO_x$ emissions in the full-load range, the auxiliary burner system leads to substantially higher $NO_x$ emissions at part-load operation. The attempt, which has become known on various occasions, to operate the auxiliary diffusion burners with a weaker mixture or to use smaller auxiliary burners must fail because the burn-out deteriorates and the CO/UHC emissions increase very sharply In the language of the specialist, this state of affairs has become known as the CO/UHC—$NO_x$ dilemma.

SUMMARY OF THE INVENTION

Accordingly, one object of this invention is to minimize the $NO_x$ emissions in a combustion chamber of the type mentioned at the beginning.

For this purpose, one small premixed burner is provided between every two large premixed burners, both types of burners generating a swirl in the same flow rotational direction.

The large premixed burners, referred to in what follows as the main burners, have a size relationship (in terms of the burner air flowing through them) relative to the small premixed burners, referred to in what follows as the pilot burners, which is determined from case to case. The pilot burners operate as independent premixed burners over the whole of the load range of the combustion chamber, the excess air number remaining almost constant. Because the pilot burners can now be operated over the whole of the load range with an ideal mixture (premixed burners), the $NO_x$ emissions are very low even at part load.

An advantageous embodiment of the invention is then achieved if the main burners and the pilot burners consist of different sizes of so-called double-cone burners and if the latter are integrated into an annular combustion chamber. Because the circulating stream lines in the annular combustion chamber in such a constellation come very close to the centers of the vortices of the pilot burners, ignition is possible by means of these pilot burners only. During run-up, the fuel quantity supplied via the pilot burners is increased until the pilot burners reach their nominal value, i.e. until the full fuel quantity is available. The configuration is selected in such a way that this point corresponds to the load rejection condition of the gas turbine. A further increase in output then takes place by means of the main burners. At the peak load of the plant, the full load of the main burners is also selected Because the configuration of "small" hot vortex centers (pilot burners) between large cooler vortex centers (main burners) is extremely unstable, very good burn-out with low CO/UHC emissions is also obtained when the main burners are run very weak in the part-load range, i.e. the hot vortices of the pilot burners penetrate immediately into the cold vortices of the main burners.

Advantageous and desirable extensions of the way in which the object is achieved according to the invention are described in the further dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
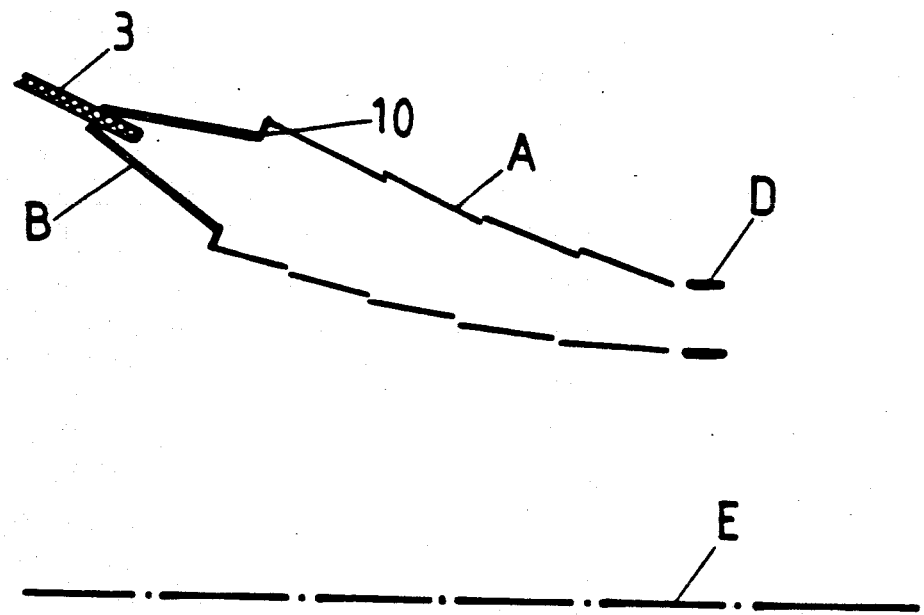
FIG. 1a shows a diagrammatic section through an annular combustion chamber in the plane of a main burner.
Figure 1B:
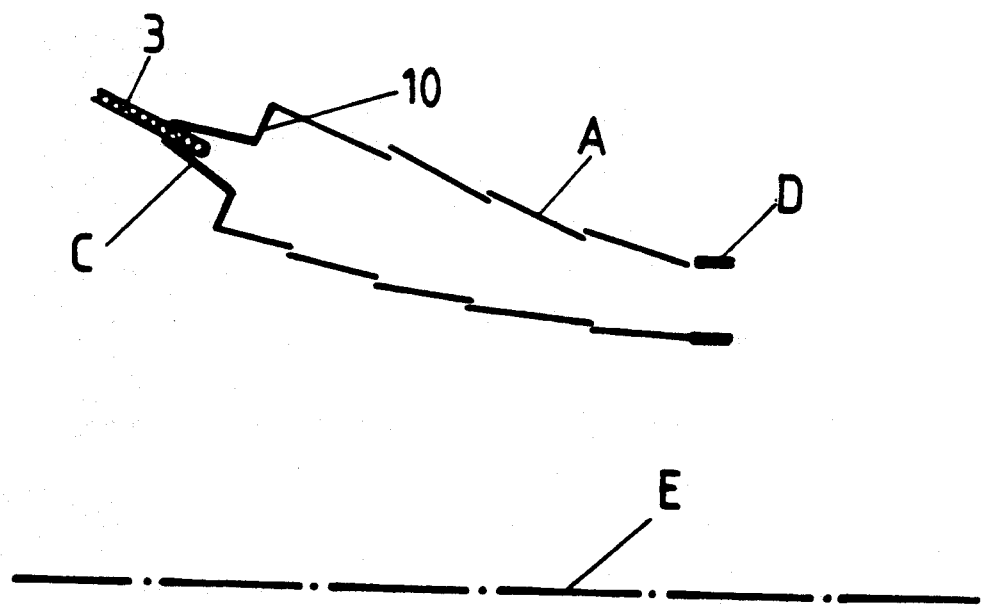
FIG. 1b shows a further diagrammatic section through an annular combustion chamber in the plane of a pilot burner.

Referring now to the drawings, wherein like reference numerals and letters designate identical or corresponding parts throughout the several views, in which all the elements not necessary for immediate understanding of the invention are omitted and in which the flow directions of the media are indicated by arrows, FIGS. 1a and 1b show a diagrammatic section through an annular combustion chamber A, in the planes of a main burner B and a pilot burner C respectively. The annular combustion chamber A shown here has a conical shape in the direction of the turbine inlet D, as is apparent from the center line E of the annular combustion chamber A shown. An individual nozzle 3 is allocated to each burner B, C. This diagrammatic representation is itself sufficient to indicate that the burners B, C are, at the same time, premixed burners, i.e. do not need the otherwise conventional premixing zone. These premixed burners B, C must of course, independently of their specific concept, be designed in such a way that there is no danger of burnback into the premixed zone via the particular front panel 10. A premixed burner which meets this condition extemely well is shown in FIGS. 2-5 and is explained in more detail below, it being possible for the construction of the two types of burner (main burner B/pilot burner C) to be the same, only their size being different. In an annular combustion chamber A of medium size, the size ratio between the main burner B and the pilot burner C is selected in such a way that approximately 23% of the burner air flows through the pilot burners C and approximately 77% through the main burners B.

Figure 2:
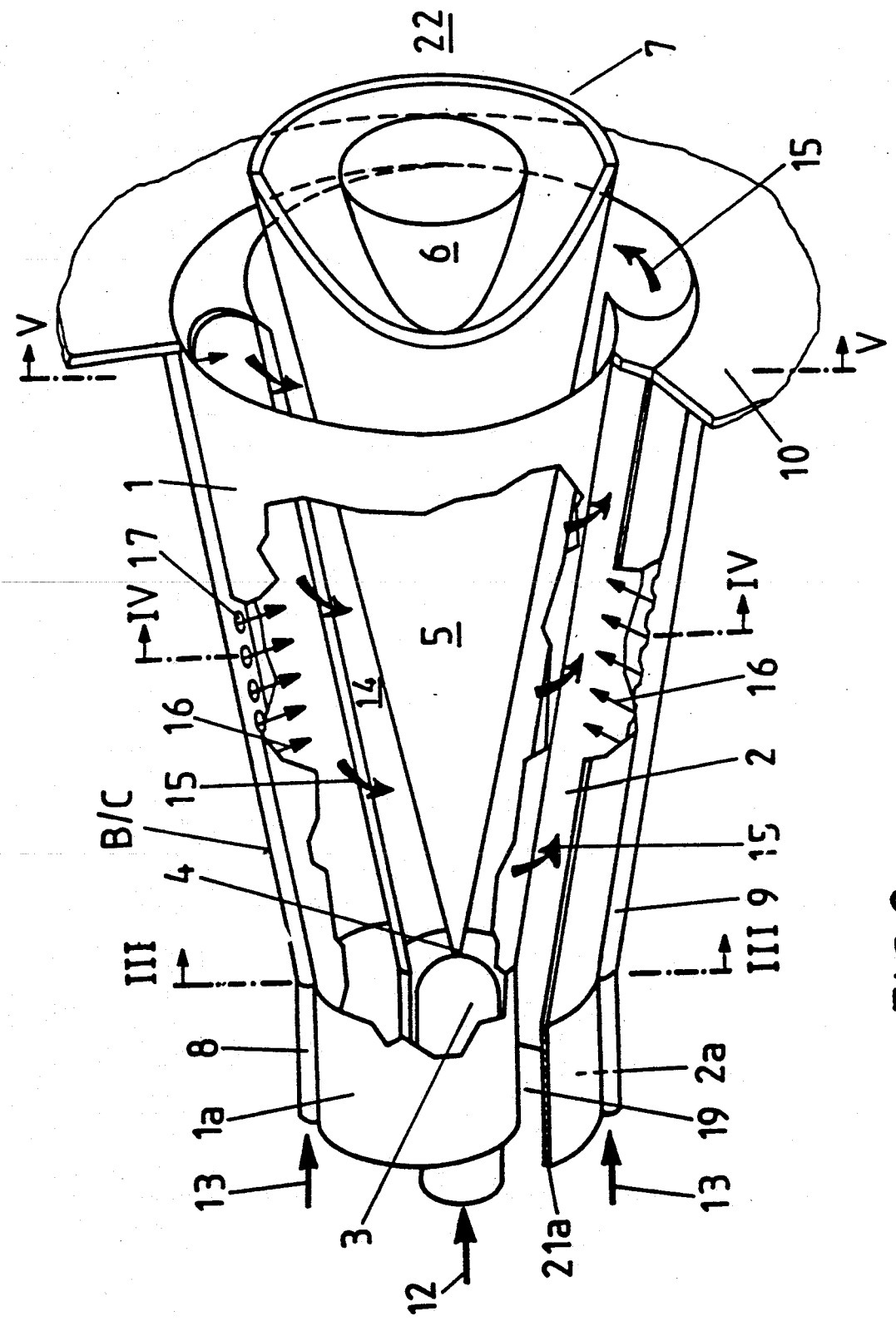
FIG. 2 shows a double-cone burner in perspective view, appropriately sectioned, FIG. 3,4,5 show corresponding sections through the planes III—III (FIG. 3), IV—IV (FIG. 4) and V—V (FIG. 5), these sections being only a diagrammatic, simplified representation of the double-cone burner of FIG. 2.
Figure 3:
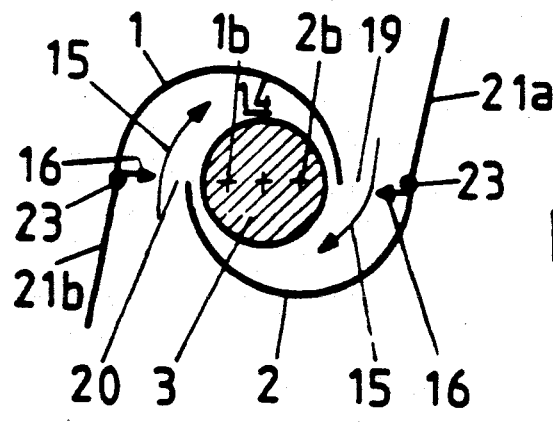
Figure 4:
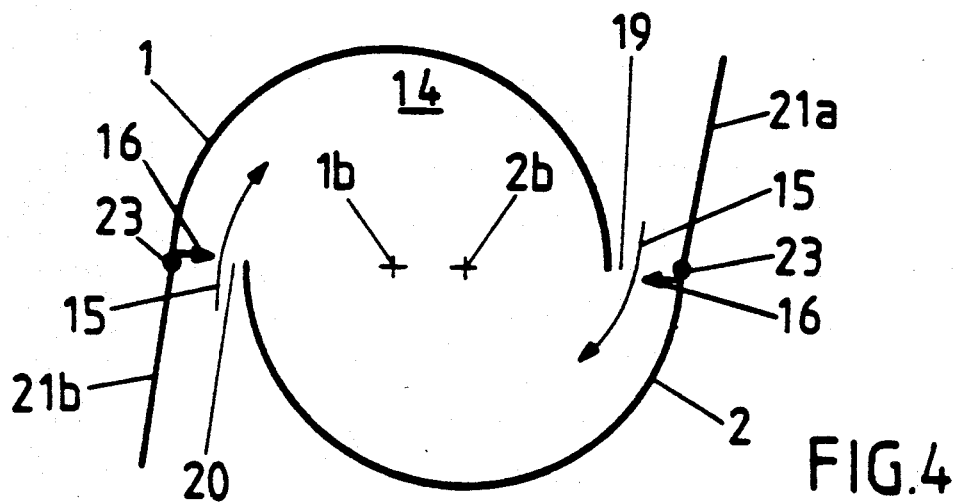
Figure 5:
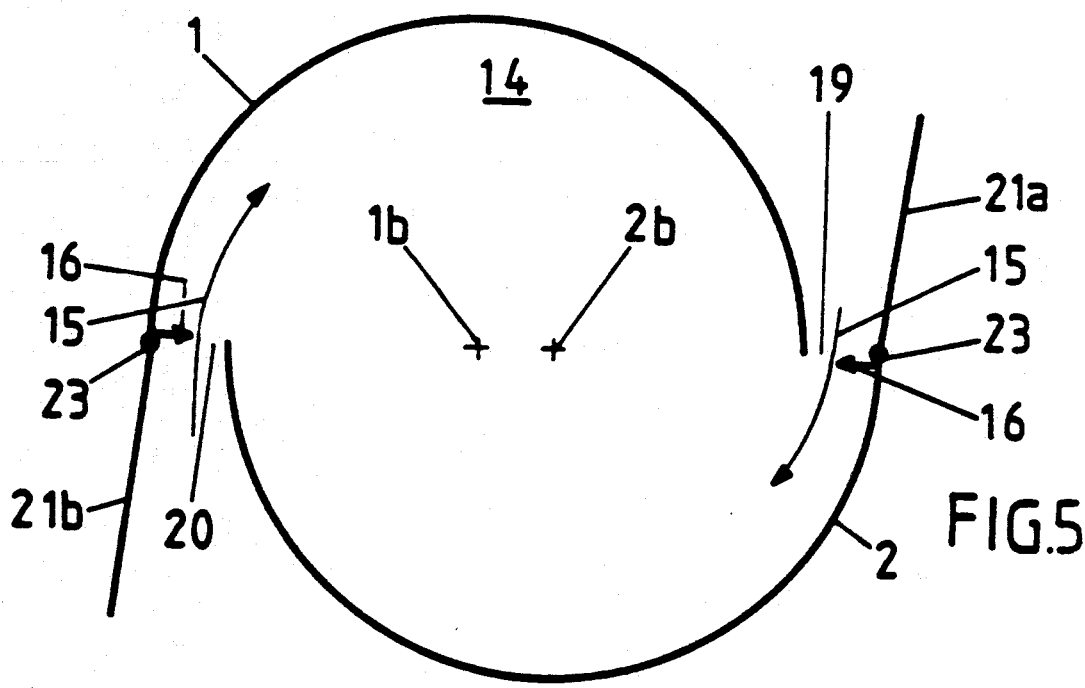

For better understanding of the construction of the burner B/C, it is advantageous to consider the individual sections of FIGS. 3–5 at the same time as FIG. 2. In addition, the guide plates 21a, 21b shown diagrammatically in FIGS. 3–5 are only indicated in FIG. 2 in order to avoid making the latter unnecessarily difficult to understand. In what follows, reference will be made to the remaining FIGS. 2–4 as required even when describing FIG. 2.

The burner B/C of FIG. 2, which in terms of its structure can be either pilot burner C or main burner B, consists of two half hollow partial conical bodies, 1, 2, which are located one on the other but are offset relative to one another The offset of the particular center lines 1b, 2b of the partial conical bodies 1, 2 relative to one another creates tangential air inlet slots 19, 20 on both sides in a mirror-image arrangement (FIGS. 3–5); the combustion air 15 flows through these slots into the internal space of the burner, i.e. into the conical hollow space 14. The two partial conical bodies, 1, 2 each have a cylindrical initial part 1a, 2a, which parts also extend offset relative to one another in a manner analogous to the partial conical bodies 1, 2, so that the tangential air inlet slots 19, 20 are available from the beginning. A nozzle 3 is located in this cylindrical initial part 1a, 2a and its fuel spray inlet 4 coincides with the narrowest cross-section of the conical hollow space 14 formed by the two partial conical bodies 1, 2. The size of this nozzle 3 depends on the type of burner, i.e. on whether it is a pilot burner C or a main burner B. The burner can, of course, be designed to be purely conical, i.e. without cylindrical initial parts 1a, 2a. Both partial conical bodies 1, 2 have a fuel guide 8, 9, which is provided with openings 17 through which the gaseous fuel 13 is added to the combustion air 15 flowing through the tangential air inlet slots 19, 20. The position of these fuel guides 8, 9 is located at the end of the tangential air inlet slots 19, 20 so that the mixing 16 of this fuel 13 with the entering combustion air 15 also takes place at this location. At the combustion space end 22, the burner B/C has a plate which forms the front wall 10. The liquid fuel 12 flowing through the nozzle 3 is sprayed into the conical hollow space 14 at an acute angle in such a way that a conical fuel spray, which is as homogeneous as possible, forms at the burner outlet The fuel spray inlet 4 can consist of an air-supported nozzle or a pressure atomizer In certain types of operation of the combustion chamber, it is obviously possible that it can also consist of a dual burner with gaseous and liquid fuel supply as is described, for example in EP-A1 210 462. The conical liquid fuel profile 5 from the nozzle 3 is enclosed by a tangentially entering rotating combustion air flow 15. In the axial direction, the concentration of the liquid fuel 12 is continuously reduced by the admixture of the combustion air 15. If gaseous fuel 13/16 is burned, the mixture formation with the combustion air 15 takes place directly at the end of the air inlet slots, 19, 20. If liquid fuel 12 is sprayed in, the optimum, homogeneous fuel concentration across the cross-section is achieved in the region of the collapse of the vortex, i.e. in the region of the reverse flow zone 6. Ignition takes place at the tip of the reverse flow zone 6. It is only at this position that a stable flame front 7 can occur. Burn-back of the flame into the inside of the burner (latently possible with known premixed sections and against which help is provided by complicated flame holders) does not have to be feared in the present case. If the combustion air 15 is preheated, natural evaporation of the liquid fuel 12 occurs before the point is reached, at the outlet of the burner, at which ignition of the mixture can occur. The degree of evaporation is, of course, dependent on the size of the burner, the droplet size distribution in the case of liquid fuel and the temperature of the combustion air 15. Independently, however, of whether apart from a homogeneous droplet mixture by low temperature combustion air 15 or, in addition, a partial or the complete droplet evaporation is achieved by preheated combustion air 15 (sic), the oxides of nitrogen and carbon monoxide emissions are found to be low if the air excess is at least 60%, thus making available an additional arrangement for minimizing the $NO_x$ emissions. In the case of complete evaporation before entry into the combustion zone, the pollutant emission figures are at a minimum. The same also applies to operation near stoichiometric if the excess air is replaced by recirculating exhaust gas. In the design of the partial conical bodies 1, 2 with respect to cone inclination and the width of the tangential air inlet slots 19, 20, narrow limits have to be maintained so that the desired flow field of the air is achieved with its reverse flow zone 6 in the region of the burner outlet for flame stabilization purposes. In general, it may be stated that a reduction of the air inlet slots 19, 20 displaces the reverse flow zone 6 further upstream so that then, however, the mixture ignites earlier. It should, nevertheless, be noted that the reverse flow zone 6, once fixed geometrically, is inherently positionally stable because the swirl number increases in the flow direction in the region of the conical shape of the burner. For a given installation length of the burner, the construction is extremely suitable for varying the size of the tangential air inlet slots 19, 20 because the partial conical bodies 1, 2 are fixed to the closure plate 10 by means of a releasable connection. The distance between the two center lines 1b, 2b is reduced or increased by radial displacement of the two partial conical bodies 1, 2 towards or away from one another and the gap size of the tangential air inlet slots 19, 20 alters correspondingly, as can be seen particularly well from FIGS. 3–5. The partial conical bodies 1, 2 can also, of course, be displaced relative to one another in a different plane and it is even possible to overlap them. It is, in fact, even possible to displace the partial conical bodies 1, 2 in a spiral manner relative to one another by means of opposite rotary motions. It is therefore possible to vary the shape and size of the tangential air inlets 19, 20 arbitrarily so that the burner can be adapted individually without changing its installation length.

The position of the guide plates 21a, 21b is apparent from FIGS. 3–5. They have flow inlet functions and, in accordance with their length, extend the relevant end of the partial conical bodies 1 and 2 in the combustion air inlet flow direction 15. The ducting of the combustion air into the conical hollow space 14 can be optimized by opening or closing the guide plates 21a, 21b about the center of rotation 23; this is particularly necessary when the original gap size of the tangential air inlet slots 19, 20 is changed. The burner can, of course, also be operated without guide plates.

Figure 6:
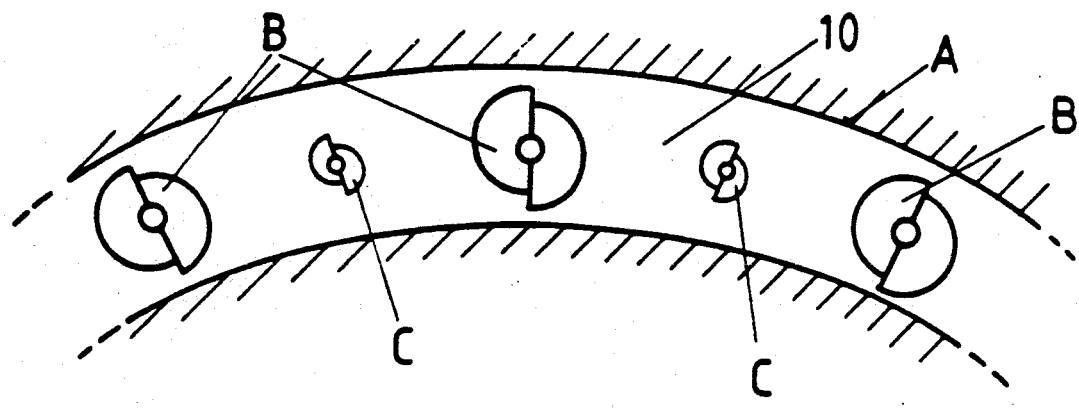
FIG. 6 shows a view on the front wall with diagrammatically indicated double-cone burners and FIG. 7 projects the shape of the stream lines onto the front wall.

FIG. 6 shows a detail of a sector of the front wall 10. This shows the positioning of the individual main burners B and pilot burners C. These are distributed evenly and alternately around the periphery of the annular combustion chamber A. The difference in size shown between the main burners B and pilot burners C is only of a qualitative nature. The effective size of the individual burners and their distribution and number on the periphery of the front wall 10 and the annular combustion chamber A depends, as already described, on the power and size of the combustion chamber itself. The main burners B and pilot burners C, which are arranged alternately, all enter a uniform annular front wall 10 (which forms the inlet surface of the annular combustion chamber A) at the same level.

Figure 7:
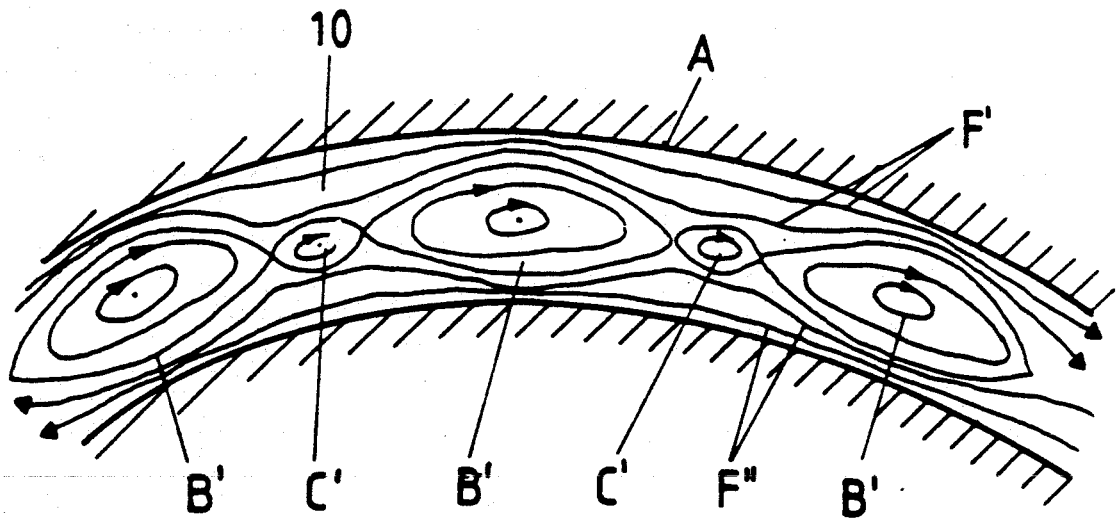

FIG. 7 shows the same detail as FIG. 6 but in this case, the individual vortex centers generated by the particular burners are shown. The small hot vortex centers C', which are derived from the pilot burners C and act between the large cooler vortex centers B', which are derived from the main burners B, are extremely unstable so that after they have been put into operation, they have a tendency to penetrate immediately into the cooler vortex centers B'. This has the effect that even when the main burners B are operated with a weak mixture, as is the case in partload operation, very good burn-out occurs with low CO/UHC emissions.

Because the main burner B and the pilot burner C generate vortices in the same direction, a peripheral flow enclosing the burners B and C occurs above and below these burners, as is expressed by the stream lines F' and F''. As an explanation of this condition, reference is made to an endless conveyor belt as a comparison, this belt being kept in motion by rollers turning in the same direction. The role of the rollers is in this case undertaken by the burners operating in the same direction.

Obviously, numerous modifications and variations of the present invention are possible in light of the above teachings It is therefore to be understood that, within the scope of the appended claims, the invention may be practiced otherwise than as specifically described herein.

What is claimed as new and desired to be secured by Letters Patent of the United States is:

1. A combustion chamber of a gas turbine comprising:
   an annular inlet flow end;
   a plurality of premix burners positioned adjacent each other around a circumference of said inlet flow end, each of said premix burners being directed in the same swirl direction;
   said plurality of premix burners including large premix burners and small premix burners according to an amount of air directed through each of said burners;
   each of said small premix burners being positioned between two of said large premix burners;
   each of said premix burners including at least two hollow part conical bodies positioned together to form a burner interior that has a cone inclination increasing in a flow direction, said bodies positioned together such that center longitudinal axes of said bodies are offset from each other;
   each of said premix burners having tangential air inlet slots for introducing combustion air into the interior of said burner body, said air inlet slots extending substantially the length of said burner body;
   a nozzle for supplying a conical column of fuel within said burner body substantially along the length of said burner body, said nozzle having means for injecting fuel disposed at a location between said offset longitudinal axes of said part conical bodies.

2. A combustion chamber of a gas turbine according to claim 1, wherein said large premix burners are sized to provide for approximately 77% of a total burner air flow and said small premix burners are sized to provide for approximately 23% of the total burner air flow.

3. A combustion chamber of a gas turbine according to claim 1, wherein said large premix burners are main burners and said small premix burners are pilot burners.

4. A combustion chamber of a gas turbine according to claim 1, wherein each of said plurality of premix burners further includes a plurality of fuel nozzles disposed at an air inlet slot region on each burner.

5. A combustion chamber of a gas turbine according to claim 1, wherein said combustion chamber is shaped as an annular combustion chamber having a periphery wherein said large and small premix burners are alternately disposed at a uniform distance from each other at said inlet flow end, said large and small premix burners each extending into a single annular front wall positioned toward said inlet flow end.

* * * * *

UNITED STATES PATENT AND TRADEMARK OFFICE
CERTIFICATE OF CORRECTION

PATENT NO. : 5,081,844
DATED : January 21, 1992
INVENTOR(S) : JAKOB KELLER, et al.

It is certified that error appears in the above-identified patent and that said Letters Patent is hereby corrected as shown below:

On the title page: Item

[30]   Foreign Application Priority Data

Mar. 15, 1989 [CH]   Switzerland ...................... 945/89-5

Signed and Sealed this

Twenty-second Day of June, 1993

Attest:

MICHAEL K. KIRK

*Attesting Officer*   Acting Commissioner of Patents and Trademarks